(12) United States Patent
Zheng et al.

(10) Patent No.: US 12,354,144 B2
(45) Date of Patent: Jul. 8, 2025

(54) VIRTUAL GIFT DISPLAY METHOD, SERVER, AND TARGET RECEIVING END

(71) Applicant: Beijing Bytedance Network Technology Co., Ltd., Beijing (CN)

(72) Inventors: Yi Zheng, Beijing (CN); Xiaodong Wang, Beijing (CN); Shaoyuan Zhu, Beijing (CN)

(*) Notice: Subject to any disclaimer, the term of this patent is extended or adjusted under 35 U.S.C. 154(b) by 3 days.

(21) Appl. No.: 18/087,662

(22) Filed: Dec. 22, 2022

(65) Prior Publication Data

US 2023/0132073 A1    Apr. 27, 2023

Related U.S. Application Data

(63) Continuation of application No. PCT/CN2021/113341, filed on Aug. 18, 2021.

(30) Foreign Application Priority Data

Aug. 24, 2020    (CN) .......................... 202010859741.0

(51) Int. Cl.
  *G06Q 30/00*    (2023.01)
  *G06Q 30/0235*    (2023.01)
  (Continued)

(52) U.S. Cl.
  CPC ..... *G06Q 30/0625* (2013.01); *G06Q 30/0235* (2013.01); *G06Q 30/0601* (2013.01); *H04N 21/254* (2013.01); *H04L 51/07* (2022.05)

(58) Field of Classification Search
  None
  See application file for complete search history.

(56) References Cited

U.S. PATENT DOCUMENTS

2003/0014306 A1*  1/2003  Marko ................. G07G 5/00
                                                705/14.13
2007/0219863 A1*  9/2007  Park ................. G06Q 30/0214
                                                705/14.35
(Continued)

FOREIGN PATENT DOCUMENTS

CN    104994421 A    10/2015
CN    105516784 A     4/2016
(Continued)

OTHER PUBLICATIONS

Https://steamcommunity.com/sharedfiles/filedetails/?id=891025787—"Collection of Steam Badges"—by Vault Girl (Year: 2019).*
(Continued)

*Primary Examiner* — Christopher Stroud
(74) *Attorney, Agent, or Firm* — Alleman Hall & Tuttle LLP

(57) ABSTRACT

Methods for displaying a virtual gift, a server, and a target receiving terminal are provided. With the method, multimedia information to be published is obtained, if the attribute information of the multimedia information includes preset tag information, the target receiving terminal is determined. In addition, a validity period is set for the virtual gift. When sending the virtual gift to the target receiving terminal, the virtual gift of the current level can be obtained based on the current purchase quantity of the virtual gift and a predetermined correspondence between the purchase quantity and the level of the virtual gift.

11 Claims, 9 Drawing Sheets

Torch of a first level

Torch of a second level

Torch of a third level

Torch of a fourth level

Torch of a fifth level

(51) Int. Cl.
*G06Q 30/0601* (2023.01)
*H04N 21/254* (2011.01)
*H04L 51/07* (2022.01)

(56) References Cited

U.S. PATENT DOCUMENTS

| | | | | |
|---|---|---|---|---|
| 2008/0275786 | A1* | 11/2008 | Gluck | G06Q 30/0235 705/14.35 |
| 2012/0330741 | A1* | 12/2012 | Cruz | G06Q 30/0214 705/14.31 |
| 2013/0096981 | A1* | 4/2013 | Evans | G06Q 30/0252 705/7.29 |
| 2013/0185122 | A1* | 7/2013 | Smadja | G06Q 30/0277 705/14.1 |
| 2013/0238445 | A1* | 9/2013 | Rao | G06Q 30/0267 705/14.66 |
| 2013/0254038 | A1* | 9/2013 | Bradley | G06Q 30/0267 705/14.64 |
| 2013/0311255 | A1* | 11/2013 | Cummins | G06Q 30/0235 705/14.1 |
| 2014/0257852 | A1* | 9/2014 | Walker | G06Q 10/10 705/3 |
| 2015/0100398 | A1* | 4/2015 | Narayanaswami | G06Q 30/0236 705/14.1 |
| 2016/0150294 | A1* | 5/2016 | Phatak | H04N 21/4126 725/23 |
| 2016/0292711 | A1* | 10/2016 | Cho | G06Q 30/0239 |
| 2019/0238488 | A1* | 8/2019 | Peng | G06Q 20/0655 |
| 2021/0125145 | A1* | 4/2021 | Petrie | G06Q 10/0838 |

FOREIGN PATENT DOCUMENTS

| | | |
|---|---|---|
| CN | 105959127 A | 9/2016 |
| CN | 106604100 A | 4/2017 |
| CN | 107423809 A | 12/2017 |
| CN | 109120949 A | 1/2019 |
| CN | 109120964 A | 1/2019 |
| CN | 109246452 A | 1/2019 |
| CN | 110225408 A | 9/2019 |
| CN | 110278446 A | 9/2019 |
| CN | 110460909 A | 11/2019 |
| CN | 110572690 A | 12/2019 |
| CN | 110909184 A | 3/2020 |
| CN | 111031334 A | 4/2020 |
| CN | 111970530 A | 11/2020 |
| JP | 2020096341 A | 6/2020 |
| WO | 0191474 A2 | 11/2001 |
| WO | 0191474 A3 | 11/2001 |
| WO | 2014015365 A1 | 1/2014 |

OTHER PUBLICATIONS

China National Intellectual Property Administration, Office Action Issued in Application No. 202010859741.0, Nov. 2, 2021, 12 pages.
ISA China National Intellectual Property Administration, International Search Report Issued in Application No. PCT/CN2021/113341, Nov. 4, 2021, WIPO, 4 pages.
European Patent Office, Extended European Search Report Issued in Application No. 21860238.1, Nov. 2, 2023, Germany, 59 pages.
Japan Patent Office, Office Action Issued in Application No. 2023-511573, Mar. 5, 2024, 3 pages.

* cited by examiner

Minutes left before the
rocket is expired

24: 59: 59

5000 torches have been lighted 500 short for upgrading 8000 torchbearers have
been assisted played for 8 million times

FIG. 5

VIRTUAL GIFT DISPLAY METHOD, SERVER, AND TARGET RECEIVING END

The present application is a continuation of International Patent Application No. PCT/CN2021/113341, filed on Aug. 18, 2021, which claims priority to Chinese Patent Application No. 202010859741.0, titled "VIRTUAL GIFT DISPLAY METHOD, SERVER, AND TARGET RECEIVING END", filed on Aug. 24, 2020 with the National Intellectual Property Administration, PRC, both of which are incorporated herein by reference in their entireties.

FIELD

The present disclosure relates to the technical field of data processing, and in particular to a method and apparatus for displaying a virtual gift, a server, and a target receiving terminal.

BACKGROUND

With the development of Internet live broadcast platforms, video and online live broadcast technology have developed rapidly, and popular interactive ways have emerged in the industry, where giving virtual gifts is the most popular way at present.

In the existing process of giving virtual gifts, usually, a user first selects a target virtual gift from a virtual gift list displayed in a live broadcast room, clicks a gift option of the target virtual gift, and sends an instruction for giving the virtual gift to the server, and the server sends the virtual gift to complete the process of giving the virtual gift.

In the above process, since the virtual gift is chosen by the user, and a host my only know what the specific gift is when the host receives the virtual gift. If the host needs some specific gifts, the host needs to inform the user in advance, thus increasing the cost of communication. In addition, users may choose from a wide variety of virtual gifts, which leads to a long time to purchase gifts. Further, when the gifts received by the host are displayed in the live broadcast room, only the quantity of the virtual gift is counted, the display way is relatively simple and the interaction is poor.

SUMMARY

A method for displaying a virtual gift, a server and a target receiving terminal are provided according to the present disclosure, to solve the above problems or at least partially solve the above problems.

In a first aspect, a method for displaying a virtual gift is provided, which is applied to a server. The method includes:
obtaining multimedia information to be published, determining a target receiving terminal if attribute information of the multimedia information includes preset tag information, pushing the multimedia information to the target receiving terminal, and determining a validity period of a virtual gift corresponding to the multimedia information;
obtaining, if it is determined that the target receiving terminal has received the multimedia information within the validity period of the virtual gift, a current level of the virtual gift based on a current purchase quantity of the virtual gift and a predetermined correspondence between a purchase quantity and a level of the virtual gift; and
pushing the virtual gift of the current level to the target receiving terminal, for the target receiving terminal to display.

In the second aspect, a method for displaying a virtual gift is provided, which is applied to an information publishing terminal. The method includes:
creating multimedia information to be published, and adding tag information in attribute information of the multimedia information; and
sending the multimedia information with the tag information to a server, where the multimedia information with the tag information is used for the server to determine a target receiving terminal for receiving the multimedia information.

In a third aspect, a method for displaying a virtual gift is provided, which is applied to a target receiving terminal. The method includes:
receiving multimedia information, and sending, to a server, response information for receiving the multimedia information, where the response information is used for the server to push a virtual gift of a current level; and
receiving and displaying the virtual gift of the current level.

In a fourth aspect, a server is provided, which includes: a content checking module, a display updating module, and a display pushing module. The content checking module is configured to obtain multimedia information to be published, determine a target receiving terminal if attribute information of the multimedia information includes preset tag information, push the multimedia information to the target receiving terminal, and determine a validity period of a virtual gift corresponding to the multimedia information. The display updating module is configured to obtain, if it is determined that the target receiving terminal has received the multimedia information within the validity period of the virtual gift, a current level of the virtual gift based on a current purchase quantity of the virtual gift and a predetermined correspondence between a purchase quantity and a level of the virtual gift. The display pushing module is configured to push the virtual gift of the current level to the target receiving terminal, for the target receiving terminal to display.

In a fifth aspect, an information publishing terminal is provided, which includes: a media information creating module, and a media information publishing module. The media information creating module is configured to create multimedia information to be published, and add tag information to attribute information of the multimedia information. The media information publishing module is configured to send the multimedia information with the tag information to a server, where the multimedia information with the tag information is used for the server to determine a target receiving terminal for receiving the multimedia information.

In a sixth aspect, a target receiving terminal is provided, which includes: a response information sending module and a display information receiving module. The response information sending module is configured to receive multimedia information, and send, to a server, response information for receiving the multimedia information, where the response information is used for the server to push the virtual gift of a current level. The display information receiving module is configured to receive and display the virtual gift of the current level.

In a seventh aspect, an electronic device is provided according to the present disclosure, which includes a memory, a processor, and a computer program stored in the memory and running on the processor. The processor is configured to perform steps of the method in any one of the first to third aspects when executing the program.

In an eighth aspect, a non-transitory computer-readable storage medium is provided according to the present disclosure, which includes a computer program stored thereon, and the computer program, when executed by a processor, performs steps of the method in any one of the first to third aspects.

With the method for displaying a virtual gift, the server, and the target receiving terminal according to present disclosure, multimedia information to be published is obtained, if the attribute information of the multimedia information includes preset tag information, the target receiving terminal is determined, so that a specific user can view the virtual gift, increasing enthusiasm of the user for participation. In addition, a validity period is set for the virtual gift, so that the user who see the virtual gift is motivated to purchase the virtual gift. When sending the virtual gift to the target receiving terminal, the virtual gift of the current level can be obtained based on the current purchase quantity of the virtual gift and a predetermined correspondence between the purchase quantity and the level of the virtual gift, so that the shape of the virtual gift changes with the purchase quantity, diversifying the display of the virtual gift, improving joy of the user when interacting with a creator.

BRIEF DESCRIPTION OF THE DRAWINGS

In order to illustrate the technical solutions in the embodiments of the present disclosure more clearly, drawings used in the description of the embodiments of the present disclosure are briefly described in the following.

FIG. 5 is a schematic diagram of an interface for assistance information according to the present disclosure;

DETAILED DESCRIPTION OF THE EMBODIMENTS

Figure 1:
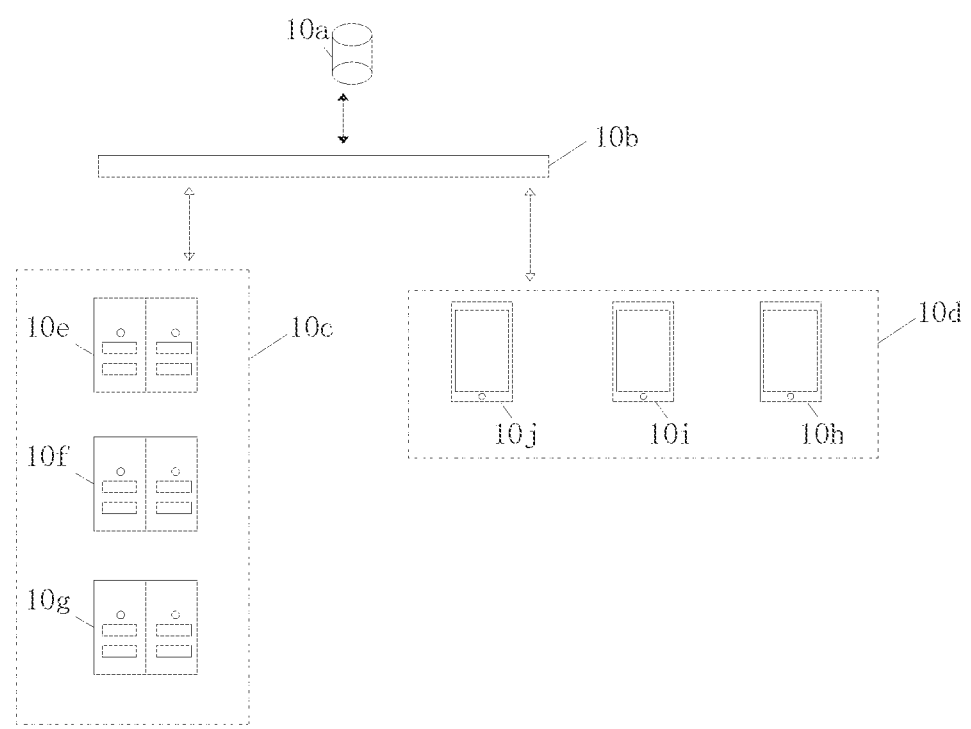
FIG. 1 is a system architecture diagram of a system for displaying a virtual gift according to the present disclosure.

Embodiments of the present disclosure are described in detail below, examples of which are illustrated in the drawings, where the same or similar reference numerals refer to the same or similar elements or elements having the same or similar functions throughout. The embodiments described below with reference to the drawings are exemplary and are only used to explain the present disclosure, but not to be construed as limiting the present disclosure.

It is to be understood by those skilled in the art that the singular forms "a," "an," and "the" as used herein may include the plural forms as well, unless expressly stated otherwise. It should be further understood that the wording "including" used in the specification of the present disclosure refers to the presence of features, integers, steps, operations, elements and/or components, but does not exclude the presence or addition of one or more other features, integers, steps, operations, elements, components and/or combinations thereof. It should be understood that when referring to an element as being "connected" or "coupled" to another element, the element may be directly connected or coupled to the other element or intervening elements may also be present. Furthermore, "connected" or "coupled" as used herein may include wirelessly connected or wirelessly coupled. As used herein, the term "and/or" includes all of the one or more associated listed items or includes any or all combinations of the one or more of the associated listed items.

In order to make the objectives, technical solutions and advantages of the present disclosure clearer, the embodiments of the present disclosure will be further described in detail below with reference to the drawings.

The method for displaying a virtual gift, the server and the target receiving terminal according to the present disclosure aim to solve the above technical problems in the conventional art.

The technical solutions of the present disclosure and how the technical solutions of the present disclosure solve the above-mentioned technical problems will be described in detail below with specific examples. The following specific embodiments may be combined with each other, and the same or similar concepts or processes may not be repeated in some embodiments. The embodiments of the present disclosure will be described below with reference to the drawings.

FIG. 1 is a system architecture diagram of a system for displaying a virtual gift according to the present disclosure. As shown in FIG. 1, a server 10a connects with an information publishing terminal cluster 10c and a receiving terminal cluster 10d through the communication bus 10b. The information publishing terminal cluster 10c includes an information publishing terminal 10e, an information publishing terminal 10f, . . . , an information publishing terminal 10g, and the receiving terminal cluster 10d includes a receiving terminal 10h, a receiving terminal 10i, . . . , a receiving terminal 10j. In a case that any information publishing terminal in the information publishing terminal cluster 10c creates multimedia information to be published, tag information is added to attribute information of the multimedia information, and the multimedia information is sent to the server 10a, and the server 10a obtains the multimedia information to be published. If the attribute information of the multimedia information includes preset tag information, a target receiving terminal is determined from the receiving terminal cluster 10d, and the multimedia information is pushed to the target receiving terminal. If the target receiving terminal has received the multimedia information within a validity period of a virtual gift, the server 10a obtains a current level of the virtual gift based on a current purchase quantity of the virtual gift and a predetermined correspondence between the purchase quantity of the virtual gift and the level of the virtual gift and push the virtual gift of the current level to the target receiving terminal, for the target receiving terminal to display the virtual gift of the current level.

Figure 2:
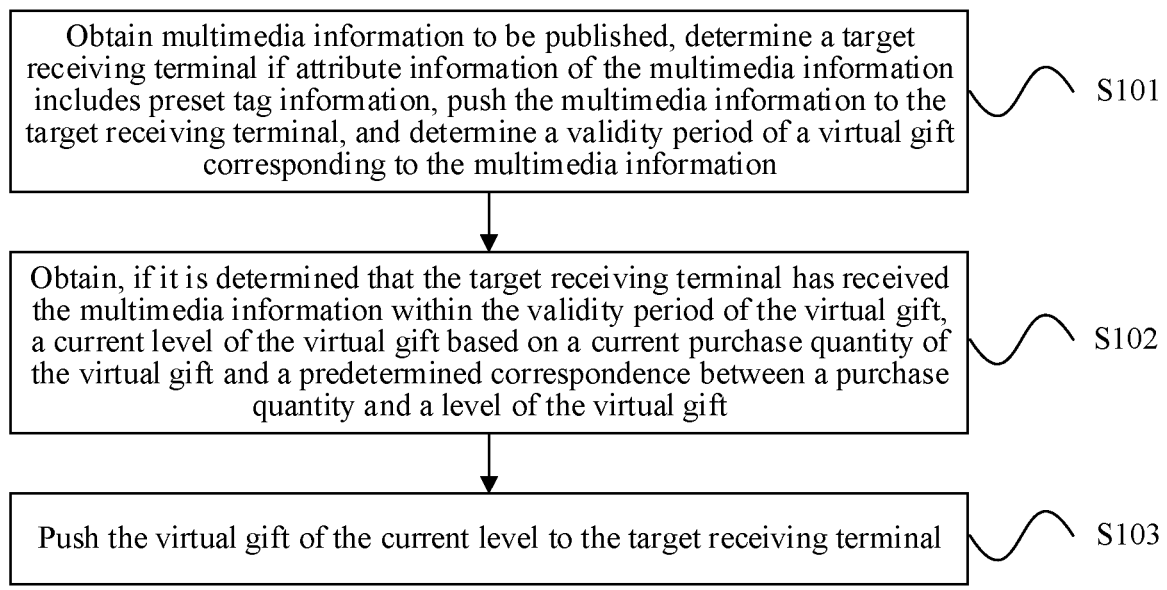
FIG. 2 is a schematic flowchart of a method for displaying a virtual gift according to the present disclosure.

A method for displaying a virtual gift is provided according to the present disclosure, which is applied to a server. As shown in FIG. 2, FIG. 2 is a schematic flowchart of a method for displaying a virtual gift according to the present disclosure. The method includes the following steps S101 to S103.

In step S101, multimedia information to be published is obtained, and if attribute information of the multimedia information includes preset tag information, a target receiving terminal is determined, the multimedia information is pushed to the target receiving terminal, and a validity period of a virtual gift corresponding to the multimedia information is determined.

In the present disclosure, the multimedia information may include one or more of text, audio and video. The attribute information is used for describing the nature of the multimedia information, which is usually edited by a creator through an information publishing terminal. In the field of video playback, especially in the field of short video playback, the most common attribute information includes the name of the video. In the present disclosure, the server may check whether the name of the multimedia information includes a preset tag to determine whether to configure a virtual gift that can be purchased and displayed for the multimedia information.

In the present disclosure, the tag information may be a combination of specific characters and specific texts, for example, "@dou+torch relay", the tag information includes two specific characters "@" and "+" and specific texts "dou"" and "torch relay", by using Chinese and English vocabularies and various characters as tag information, the detection of conventional attribute information as tag information can be avoided.

In the present disclosure, in a case of checking that the attribute information includes tag information, the target receiving terminal may be determined. The target receiving terminal is selected from the receiving terminal cluster, and the quantity of the receiving terminal may be one or more, which is not specifically limited in the present disclosure. The target receiving terminal may be a receiving terminal held by a user who has more interaction with the creator of multimedia information, or a receiving terminal held by a user who has given a virtual gift to the creator in history. In the present disclosure, the multimedia information with the tag information is only pushed to some receiving terminals, which can enhance the sense of participation of the target receiving terminals receiving the multimedia information in giving virtual gifts, and is beneficial to increase the quantity of times of giving virtual gifts.

In the conventional art, the validity period of the virtual gift is usually set to allow the purchaser to give the virtual gift as soon as possible. For example, in a case that the purchaser purchases a virtual gift, the validity period of the virtual gift is opened. If the purchaser has not given the virtual gift when the validity period is expired, the virtual gift is invalidated or the display effect of the virtual gift is reduced. In the present disclosure, the validity period of the virtual gift may affect whether the target receiving terminal can see the virtual gift. Further, if the target receiving terminal has received multimedia information within the validity period of the virtual gift, the remaining duration of the validity period may also be pushed to the target receiving terminal, to remind the user of the target receiving terminal to use the virtual gift as soon as possible.

In step S102, if it is determined that the target receiving terminal has received the multimedia information within the validity period of the virtual gift, a current level of the virtual gift corresponding to the target receiving terminal is obtained based on a current purchase quantity of the virtual gift and a predetermined correspondence between the purchase quantity and the level of the virtual gift.

In the present disclosure, the virtual gift is a gift in the virtual world, for example, virtual items such as torches, flowers, gold ingots, and airplanes. In the present disclosure, the virtual gift is determined by the server instead of the receiving terminal, so that the user of the receiving terminal does not need to spend extra energy to select the gift before purchasing the virtual gift, which improves the efficiency of giving the virtual gift.

When the server pushes the multimedia information to the target receiving terminal, since the target receiving terminal may not receive the multimedia information at the first time, the time when the target receiving terminal receives the multimedia information is determined in the present disclosure, so as to determine whether the target receiving terminal receives the multimedia information within the validity period of the virtual gift. If the target receiving terminal has received the multimedia information within the validity period of the virtual gift, based on the purchase quantity of the virtual gift at the current time, that is, at the time of receiving the multimedia information, when the receiving terminal purchases the virtual gift, a new purchase record of the virtual gift may be created in the database. The purchase record may include a receiving terminal used by the user who purchased the virtual gift, the quantity of the virtual gift purchased by the user, and the total quantity of the virtual gift purchased by all users who purchased the virtual gift, and the like. The server obtains the purchase record of the virtual gift from the database.

Figure 3:
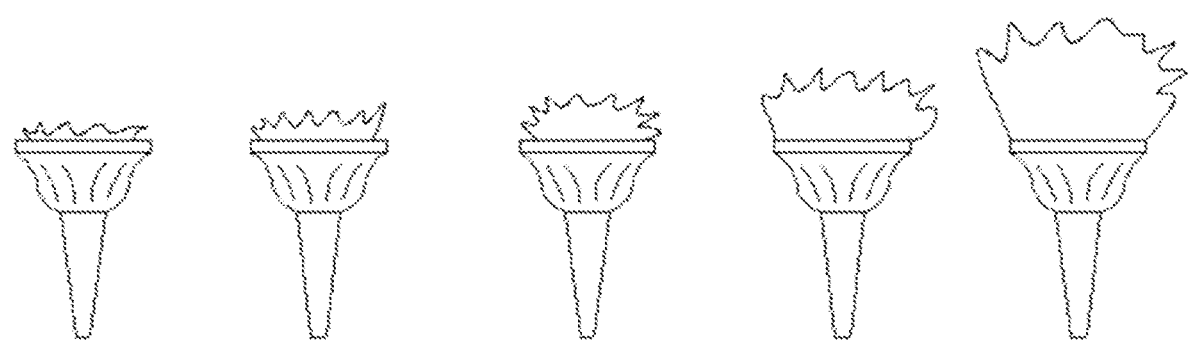
FIG. 3 is a schematic diagram of a virtual gift according to the present disclosure.

In the present disclosure, the virtual gift has multiple levels of display effects. There are differences between the display effects of different levels. The level of the display effect is related to the purchase quantity. With the increase of the purchase quantity, the display effect of the virtual gift will gradually change. FIG. 3 is a schematic diagram of a virtual gift according to the present disclosure. As shown in FIG. 3, the virtual gift is a torch and has 5 levels, and the flame of the torch gradually becomes larger as the level increases.

In step S103, the virtual gift of the current level is pushed to the target receiving terminal, for the target receiving terminal to display.

When displaying the virtual gift, the target receiving terminal of the present disclosure may display the virtual gift by using a pendant system. In the present disclosure, pendant files with different display effects may be pre-created based on different levels of the virtual gift, the pendant files may be in a flash format, the pendant file includes pendant items superimposed on the multimedia information, the pendant items are virtual gifts, and the pendant file also includes flash playback component for supporting flash playback. The target receiving terminal superimposes the display window of the pendant file onto the display window of the multimedia information to realize the display of the pendant.

The above pendant file display window may include a transparent part, so that when superimposing pendant files and the multimedia information, the transparent part of the pendant file display window displays the multimedia information, while the rest of the window displays the pendant item in the pendant file, so as to be displayed on the target receiving terminal as a multimedia message with a virtual gift.

With the method for displaying a virtual gift of the present disclosure, multimedia information to be published is obtained, if the attribute information of the multimedia information includes preset tag information, the target receiving terminal is determined, so that a specific user can view the virtual gift, increasing enthusiasm of the user for participation. In addition, a validity period is set for the virtual gift, so that the user who see the virtual gift is motivated to purchase the virtual gift. When sending the virtual gift to the target receiving terminal, the virtual gift of the current level can be obtained based on the purchase quantity and a predetermined correspondence between the purchase quantity of the virtual gift and the level of the virtual gift, so that the shape of the virtual gift changes with the purchase quantity, diversifying the display of the gift, improving joy of the user when interacting with a creator.

On the basis of the above embodiments, in an embodiment of the present disclosure, after pushing the virtual gift of the current level to the target receiving terminal, the method further includes the following steps S104 to S106.

In step S104, a purchase link of the virtual gift is generated, and the purchase link of the virtual gift is pushed to the target receiving terminal.

It is to be understood that the purchase link of the virtual gift includes purchase process information, and the purchase process information may be displayed in the form of control links, and the user performs corresponding operations based on the control links displayed in sequence, for example, the user may sequentially selects control links of payment mode, order confirmation, successful purchase and the like, to purchase the virtual gift.

In the present disclosure, a purchase icon representing the purchase link of the virtual gift may be pushed to the target receiving terminal, and the unit price of the virtual gift and the payment mode (such as UnionPay, ZhiFbao, and WeiX Pay) have been preset in the purchase icon, so that the user only needs to determine the quantity of the virtual gift to purchase and select the payment mode to purchase the virtual gift. Since the price of the virtual gift is predetermined, the gift purchasing method of the present disclosure is efficient for the user.

In step S105, a purchase operation performed by a user based on the purchase link and fed back from the target receiving terminal is received, and the purchase quantity of the virtual gift is updated based on the purchase operation.

After the user performs a purchase operation based on the purchase link, the target receiving terminal sends feedback information to the server to inform the server that the virtual gift has been purchased, and the server updates the purchase quantity of the virtual gift in a virtual gift purchase record corresponding to the information publishing terminal.

In step S106, it is determined whether to update the level of the virtual gift based on the updated purchase quantity and the correspondence, and if the level of the virtual gift is updated, the virtual gift of the updated level is pushed to the target receiving terminal.

For example, before the target receiving terminal purchases the virtual gift, the purchase quantity of the virtual gift recorded in the virtual gift purchase record corresponding to the information publishing terminal is 99, the level of the virtual gift is level 2, and the user purchases 1 virtual gift through the target receiving terminal, the server updates the purchase quantity of the virtual gift to 100, and through the correspondence, it can be determined that the level of the virtual gift is level 3 when the purchase quantity of virtual gifts is in a range of 100-200, so the virtual gift of the level 3 is sent to the target receiving terminal, so that the target receiving terminal displays the virtual gift of the level 3. It should be understood that, in some cases, the level of the virtual gift does not change after the user purchases the virtual gift, so the level of the virtual gift is not updated.

In the present disclosure, the virtual gift purchase record refers to a record of all virtual gifts received by the information publishing terminal, and the purchase record includes a unique identifier of a target receiving terminal and the quantity of the virtual gift purchased by the target receiving terminal. The purchase record may be stored in a database, and the server may obtain the purchase record from the database when needed. In the present disclosure, the server may obtain the current purchase quantity of the virtual gift by reading from the database the unique identifier of the target receiving terminal that has purchased the virtual gift and the quantity of the virtual gift purchased by the target receiving terminal, and obtaining the current purchase quantity of the virtual gift by accumulation.

If the quantity of information publishing terminal or the quantity of the virtual gift is large, there will cause a performance bottleneck if the server directly reads the purchase record from the database. Therefore, in the present disclosure, the server may obtain the current purchase quantity of the virtual gift in the following way:

when a new purchase record is stored in the database, the database sends an update message to the server, where only the newly added purchase quantity of the virtual gift is recorded in the update message, the server updates the cumulated purchase quantity of the virtual gift stored therein based on the received update message, to obtain a new cumulated purchase quantity. On the one hand, the server no longer needs to query the purchase record from the database, which saves the performance loss of the database. On the other hand, the server determines the current purchase quantity of the virtual gift by directly using the cumulated data, which is more efficient.

In the embodiment of the present disclosure, by pushing the purchase link of the virtual gift to the target receiving terminal, the user can only purchase a specific virtual gift, which reduces the time-consumption of purchasing the gift, facilitating the user to quickly complete the purchase operation of the virtual gift. Further, the level of the virtual gift is updated based on the purchase result, and the virtual gift with the updated level is pushed to the target receiving terminal, which increases the consumption enthusiasm of the user.

On the basis of the above embodiments, in an embodiment of the present disclosure, after receiving a purchase operation performed by the user based on the purchase link and fed back by the target receiving terminal, the method further includes: determining a new target receiving terminal, and pushing the multimedia information to the new target receiving terminal.

That is, in the present disclosure, the virtual gift not only has the characteristics of diversified display, but also affects the promotion of the multimedia information. As the purchase quantity of the virtual gift increases, the quantity of new target receiving terminals determined by the server will also increase, so that the multimedia information published by the creator can be seen by more users, and the enthusiasm of users for consuming the virtual gift can be further enhanced by the above setting.

On the basis of the above embodiments, in an embodiment, after receiving the purchase operation performed by the user based on the purchase link and fed back from the target receiving terminal, the method further includes:

updating the purchase quantity of the virtual gift, pushing, if the updated purchase quantity meets a preset condition, a gift collection notification to the information publishing terminal, where the gift collection notification includes a unique identifier of a user who has completed the purchase operation, so that the information publishing terminal selects the user who has completed the purchase operation as a target user based on the gift collection notification, and sends the unique identifier of the target user to the server.

In the present disclosure, after updating the purchase quantity of the virtual gift, the server may determine whether the updated purchase quantity meets the preset condition, and push the gift collection notification to the information publishing terminal only if the updated purchase quantity meets the preset condition, which can reduce the disturbance for the creator. In an embodiment, the preset condition is that the updated purchase quantity is less than N, that is, only the first N users who purchase the virtual gift will be notified to the creator.

In the present disclosure, the gift collection notification includes a user unique identifier of a user who has completed the purchase operation, and the unique identifier may be a user name. In addition, the gift collection notification may also include the quantity of the virtual gift purchased by the user, the quantity of promotions, where the quantity of promotions refers to the quantity of new target receiving terminals determined by the server based on the quantity of the virtual gift purchased by the user. In the present disclosure, the server may predetermine a correspondence between the purchase quantity of the virtual gift and the quantity of new target receiving terminals. For example, if one virtual gift is purchased, the quantity of the new target receiving terminals is determined to be 10, and if 10 virtual gifts are purchased, the quantity of the new target receiving terminals is determined to be 100, and so on. The gift collection notification is further provided with an option for sending a reply message in batches, which facilitates the creator to generate a batch reply request by selecting several users and clicking an option that matches a reply message to be sent. The server determines the users selected by the creator based on the batch reply request, inquiries the target receiving terminals of the selected users, and sends the reply message to the target receiving terminals.

Figure 4:
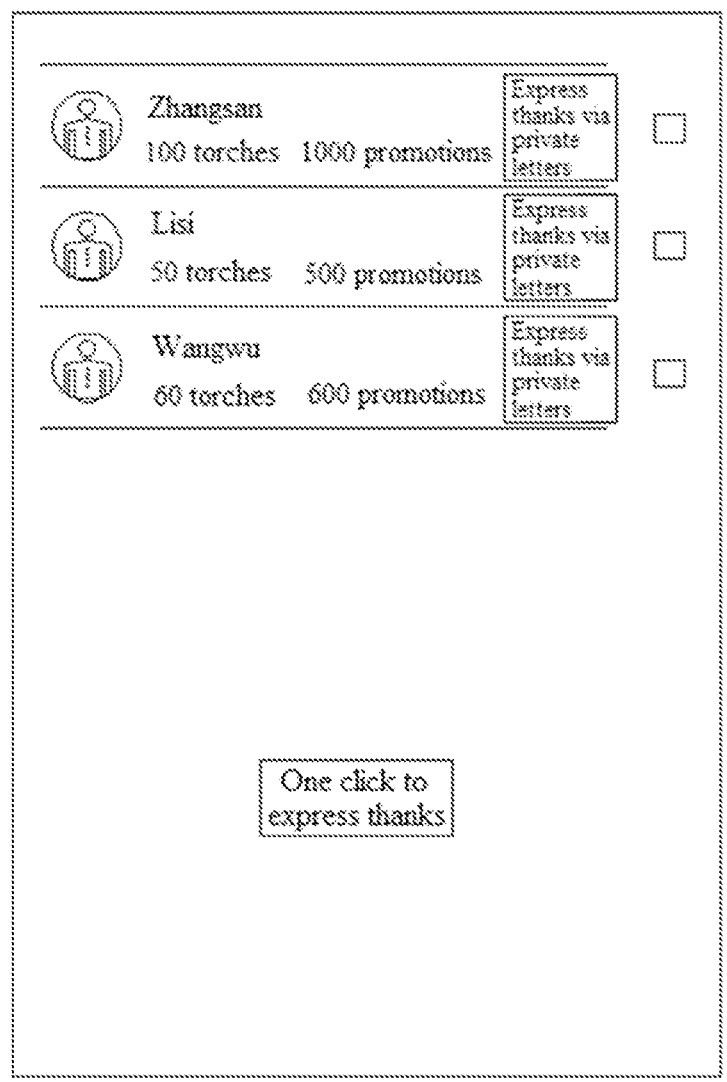
FIG. 4 is a schematic diagram of an interface for a gift collection notification according to the present disclosure.

FIG. 4 is a schematic diagram of an interface of a gift collection notification according to the present disclosure. As shown in FIG. 4, the gift collection notification shows the detail of multiple users purchasing the gift, where Zhangsan purchased 100 virtual gift torches and generated 1,000 promotions of new target receiving terminals, Lisi purchased 50 virtual gift torches, generated 500 promotions of new target receiving terminals, and Wangwu purchased 60 virtual gift torches, generated 600 promotions of new target receiving terminals. The creator can directly click an option of expressing thanks via a private message that is displayed on the right side of each user information to generate a single reply request. The single reply request records the unique identifier of the user selected by the creator, and the server determines the target receiving terminal corresponding to the user by analyzing the single reply request and sends a reply message to the target receiving terminal. The creator may also select a check box on the right side of the user information (shown as a blank box in FIG. 4), and click the option of "One click to express thanks" to generate a batch reply request. The server receives and analyzes the batch reply request, and sends the reply message to the target receiving terminals of multiple users selected by the creator.

The unique identifier of the target user is received, the target receiving terminal corresponding to the target user is determined based on the predetermined correspondence between the unique identifier of the user and the target receiving terminal, and the reply message is sent to the target receiving terminal corresponding to the target user.

Specifically, the server may pre-record the correspondence between the unique identifier of the user and the target receiving terminal. For example, an unique identifier of a user A is 001, and an unique identifier of a target receiving terminal used by the user A is 00a, and a correspondence between 001 and 00a is established, so that if the target user selected by the information publishing terminal includes the user A, the information publishing terminal 00a is determined based on the unique identifier of the user A, and the server sends a reply message to the information publishing terminal 00a.

The server may pre-configure the content of the reply message, which is a statement of expressing thanks, for example, "thank you for your encouragement, I will shoot more high-quality content for you", and "thank you for promoting my video to more people". The content of the reply message is not specifically limited in the present disclosure.

In an embodiment of the present disclosure, after determining the target user selected by the information publishing terminal, the server further pushes a template of the reply message to the information publishing terminal, where the template includes at least two selectable statements for expressing thanks. The information publishing terminal records the statement selected by the creator, and send the statement selected by the creator to the server, so that the server can send the statement selected by the creator to the target receiving terminal. This setting can enhance the diversity of the reply message and enhance the relationship between the user and the creator.

On the basis of the above embodiments, in an embodiment, the determining the validity period of the virtual gift corresponding to the multimedia information includes: setting the validity period of the virtual gift starting from a time when the multimedia information is pushed to the target receiving terminal.

Before it is determined that the target receiving terminal receives the multimedia information within the validity period of the virtual gift, the method further includes: obtaining response information sent by the target receiving terminal when receiving the multimedia information, determining, based on the response information, a time duration from a time when the multimedia information is pushed to the target receiving terminal to a time when the target receiving terminal receives the multimedia information, and determining, based on the time duration, whether the validity period of the information has expired when the target receiving terminal receives the multimedia information.

In the present disclosure, it is to be understood that the validity period of the virtual gift starts from the time when the server pushes the multimedia information to the target receiving terminal, not from the time when the target receiving terminal receives the multimedia information, thereby ensuring that all target receiving terminals, including subsequent determined new target receiving terminals, have the same validity period of the virtual gift, which is more convenient for the server to determine whether to push the virtual gift to each target receiving terminal.

When the server sends the multimedia information to the target receiving terminal, it may be determined that the server has published the multimedia information, and the time when the multimedia information is sent is the beginning of the validity period. For example, the time when the server sends the multimedia information to the target receiving terminal is 9:00, and the validity period is 6 hours, if the time when the target receiving terminal receives the multimedia information is 12:00, it is determined that the target receiving terminal has received the multimedia information within the validity period.

In the embodiment of the present disclosure, the target receiving terminal will send response information to the server after receiving the multimedia information, where the response information is used to indicate that the target receiving terminal has received the multimedia information. A time stamp may be recorded in the response information, and the time stamp represents the time when the target receiving terminal receives the multimedia information, and the server may determine the level of the virtual gift corresponding to the time recorded by the time stamp. It is to be understood that since the server is always online, it may be determined that the server can receive the response information in real time, so the response information in the present disclosure may not record a time stamp, and the server may determine the time when the response information is received as a time when the terminal receives the multimedia information.

On the basis of the above embodiment, before receiving the purchase operation performed by the user based on the purchase link and fed back from the target receiving terminal, the method further includes: pushing purchase prompt information to the target receiving terminal, where the purchase prompt information is used to prompt whether there is a chance to receive a reply message of a creator if currently purchasing the virtual gift, further enhancing enthusiasm of the user in purchasing the virtual gift.

On the basis of the above embodiments, in an embodiment, after receiving the purchase operation performed by the user based on the purchase link and fed back from the target receiving terminal, the method further includes:

pushing assistance information to the information publishing terminal, where the assistance information includes one or more of the following: a remaining duration of the validity period, the quantity of the virtual gift that has been obtained, the cumulated quantity of playbacks, the quantity of the virtual gift required the next level, and a ranking of the information publishing terminal. The ranking of the information publishing terminal is obtained by sorting the quantity of the virtual gift received by each information publishing terminal in a descending order. For example, the quantity of the virtual gift received by the information publishing terminal of a creator A is 10,000, the quantity of the virtual gift received by the information publishing terminal of a creator B is 20,000, and the quantity of the virtual gift received by the information publishing terminal of a creator C is 20,000, the quantity of the virtual gift received by the information publishing terminal of a creator D is 15,000, the ranking of the information publishing terminal of the creator A is 3 regarding the assistance information received by the information publishing terminal of the creator A.

The cumulated quantity of playbacks refers to the quantity of times that the receiving terminals play the multimedia information of the creator, which may be obtained by the server by counting the quantity of times the receiving terminals play the multimedia information.

FIG. 5 is a schematic diagram of an interface for assistance information according to the present disclosure. As shown in FIG. 5, the assistance information shows that there are 24 hours, 59 minutes and 59 seconds left in the validity period of the virtual gift, and 5,000 torches have been lighted, which means that the creator has received 5,000 torches as the virtual gift, and there still need 500 virtual gifts to raise the level of virtual gifts to a higher level. There are already 80,000 users, that is, the torchbearers have promoted the multimedia information of the creator, and obtained 8 million cumulated quantity of playbacks.

Figure 6:
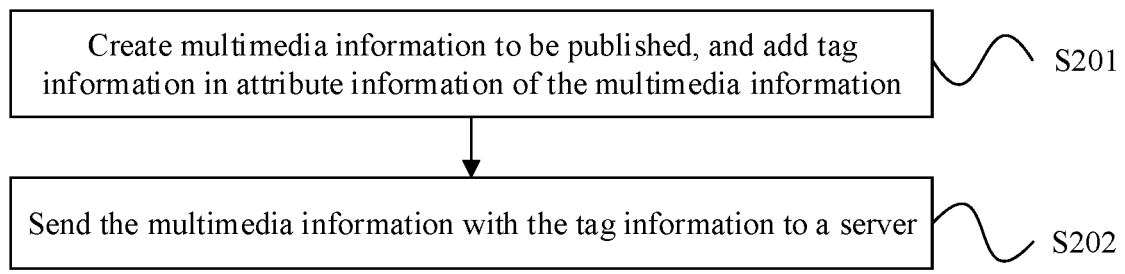
FIG. 6 is a schematic flowchart of another method for displaying a virtual gift according to the present disclosure.

A method for displaying a virtual gift is provided according to the present disclosure, which is applied to an information publishing terminal. As shown in FIG. 6, FIG. 6 is a schematic flowchart of another method for displaying a virtual gift according to the present disclosure. The method includes the following method S201 to S202.

In step S201, multimedia information to be published is created, and tag information is added to attribute information of the multimedia information.

In the present disclosure, the multimedia information may include one or more of text, audio or video. The attribute information is used for describing the nature of the multimedia information, which is usually edited by the creator through the information publishing terminal. In the field of video playback, especially in the field of short video playback, the most common attribute information is the name of the video. In the present disclosure, the server may check whether the name of the multimedia information includes a preset tag to determine whether to configure a virtual gift that can be purchased and displayed for the multimedia information.

In the present disclosure, the tag information may be a combination of specific characters and specific texts, for example, "@dou+torch relay", the tag information includes two specific characters "@" and "+" and specific texts "dou" and "torch relay", by using Chinese and English vocabularies and various characters as tag information, the detection of conventional attribute information as tag information can be avoided.

In step S202, the multimedia information with the tag information is sent to the server, where the multimedia information with the tag information is used for the server to determine a target receiving terminal for receiving the multimedia information.

By sending the multimedia information with the tag information to the server for publishing, the server may determine the target receiving terminal after checking that the attribute information includes the tag information. The target receiving terminal represents a part of receiving terminals selected from the receiving terminal cluster, and the quantity of the receiving terminal may be one or more, which is not specifically limited in the present disclosure. The target receiving terminal may be a receiving terminal held by a user who has more interaction with the creator of multimedia information, or a receiving terminal held by a user who has given a virtual gift to the creator in history. In the present disclosure, the multimedia information with the tag information is only pushed to some receiving terminals, which can enhance the sense of participation of the target receiving terminals receiving the multimedia information in giving virtual gifts, and is beneficial to increase the quantity of times of giving the virtual gift.

With the method for displaying a virtual gift according to the present disclosure, by setting tag information in the multimedia information to be published, the server can check that the multimedia information includes the tag information and determine the target receiving terminal, so that a specific user can see the virtual gift, which improve the enthusiasm of the user for participation.

On the basis of the above embodiments, in an embodiment, after sending the multimedia information to the server, the method further includes:

receiving a gift collection notification pushed by the server, and selecting a target receiving terminal that has completed the purchase operation based on the gift collection notification, so that the server sends a reply message to the target receiving terminal that has completed the purchase operation.

In the present disclosure, the gift collection notification includes a user unique identifier of the user who has completed the purchase operation, and the unique identifier may be a user name. In addition, the gift collection notification may also include the quantity of the virtual gift purchased by the user, the quantity of promotions, where the quantity of promotions refers to the quantity of new target receiving terminals determined by the server based on the quantity of the virtual gift purchased by the user. The gift collection notification is further provided with an option for sending a reply message in batches, which facilitates the creator to generate a batch reply request by selecting several users and clicking an option that matches a reply message to be sent. The server determines the users selected by the creator based on the batch reply request, inquiries the target receiving terminals of the selected users, and sends the reply message to the target receiving terminals.

Figure 7:
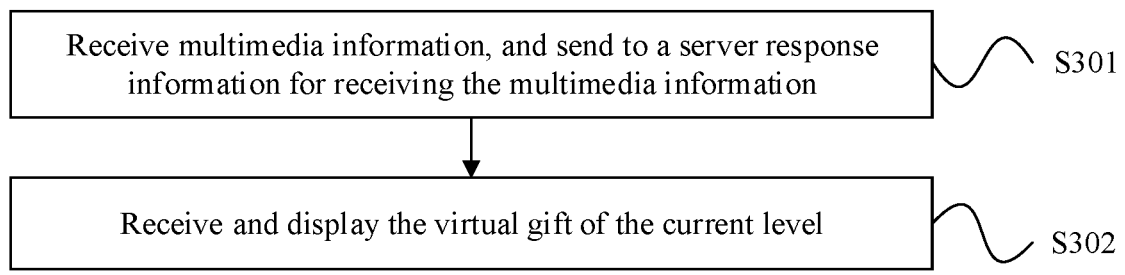
FIG. 7 is a schematic flowchart of still another method for displaying a virtual gift according to the present disclosure.

A method for displaying a virtual gift is provided according to the present disclosure, which is applied to a target receiving terminal. As shown in FIG. 7, FIG. 7 is a schematic flowchart of another method for displaying a virtual gift according to the present disclosure, and the method includes the following steps S301 to S302.

In step S301, multimedia information is received, and response information for receiving the multimedia information is sent to the server, where the response information is used for the server to push a virtual gift of a current level.

In the present disclosure, the target receiving terminal may play the multimedia information after receiving the multimedia information, and send response information for receiving the multimedia information to the server, where the response information records a time when the target receiving terminal receives the multimedia information. It can be seen that the server has set a validity period for the virtual gift, so that the server determines whether to send the virtual gift to the target receiving terminal based on the response information. If the time when the target receiving terminal receives the multimedia information is within the validity period of the virtual gift, the server determines a current level of the virtual gift, and sends the virtual gift of the current level to the target receiving terminal.

In step S302, the virtual gift of the current level is received and displayed.

When displaying the virtual gift, the target receiving terminal of the present disclosure may display the virtual gift by using a pendant system. In the present disclosure, pendant files with different display effects may be pre-created based on different levels of the virtual gift, the pendant files may be in a flash format, the pendant file includes pendant items superimposed on multimedia information, the pendant items are virtual gifts, and the pendant file also includes flash playback component for supporting flash playback. The target receiving terminal superimposes the display window of the pendant file onto the display window of the multimedia information to realize the display of the pendant.

The above pendant file display window may include a transparent part, so that when superimposing pendant files and the multimedia information, the transparent part of the pendant file display window displays the multimedia information, while the rest of the window displays the pendant item in the pendant file, so as to be displayed on the target receiving terminal as a multimedia message with a virtual gift.

With the method for displaying a virtual gift according to the present disclosure, by sending the response information for receiving the multimedia information after receiving the multimedia information, the server pushes the virtual gift of the current level to the target receiving terminal based on the response information, and the target receiving terminal receives and displays the virtual gift of the current level, so that the user can see the virtual gift, which increase the enthusiasm of the user to purchase the virtual gift.

On the basis of the above embodiments, in an embodiment, after the target receiving terminal sends response information for receiving the multimedia information to the server, the method further includes:

receiving a purchase link of the virtual gift.

It is to be understood that the purchase link of the virtual gift includes purchase process information, and the purchase process information may be displayed in the form of control links, and the user performs corresponding operations based on the control links displayed in sequence, for example, the user may sequentially selects control links of payment mode, order confirmation, successful purchase and the like, to purchase the virtual gift.

In the present disclosure, a purchase icon representing the purchase link of the virtual gift may be pushed to the target receiving terminal, and the unit price of the virtual gift and the payment mode (such as UnionPay, ZhiFbao, and WeiX Pay) have been preset in the purchase icon, so that the user only needs to determine the quantity of the virtual gift to purchase and select the payment mode to purchase the virtual gift. Since the price of the virtual gift is predetermined, the gift purchasing method of the present disclosure is efficient for the user.

The purchase operation performed by the user based on the purchase link is fed back to the server, so that the server pushes the virtual gift of an updated level to the target receiving terminal based on the purchase operation.

The target receiving terminal receives the purchase operation performed by the user based on the purchase link, and provides feedback to the server, so that the server pushes the virtual gift of the update level to the target receiving terminal based on the purchase operation. For example, before the target receiving terminal purchases the virtual gift, the purchase quantity of the virtual gift recorded in the virtual gift purchase record corresponding to the information publishing terminal is 99, the level of the virtual gift is level 2, and the user purchases 1 virtual gift through the target receiving terminal, the server updates the purchase quantity of the virtual gift to 100, and through the correspondence, it can be determined that, the level of the virtual gift is level 3 when the purchase quantity of virtual gifts is in a range of 100-200, so the virtual gift of the level 3 is sent to the target receiving terminal, so that the target receiving terminal displays the virtual gift of the level 3. It should be understood that, in some cases, the level of the virtual gift does not change after the user purchases the virtual gift, so the level of the virtual gift is not updated.

The virtual gift of the updated level is received and displayed.

In the embodiment of the present disclosure, by receiving the purchase link of the virtual gift, the user can only purchase a specific virtual gift, which reduces the time-consumption of purchasing the gift, facilitating the user to quickly complete the purchase operation of the virtual gift. Further, the level of the virtual gift is updated based on the purchase result, and the virtual gift with the updated level is pushed to the target receiving terminal, which increases the consumption enthusiasm of the user.

Figure 8:
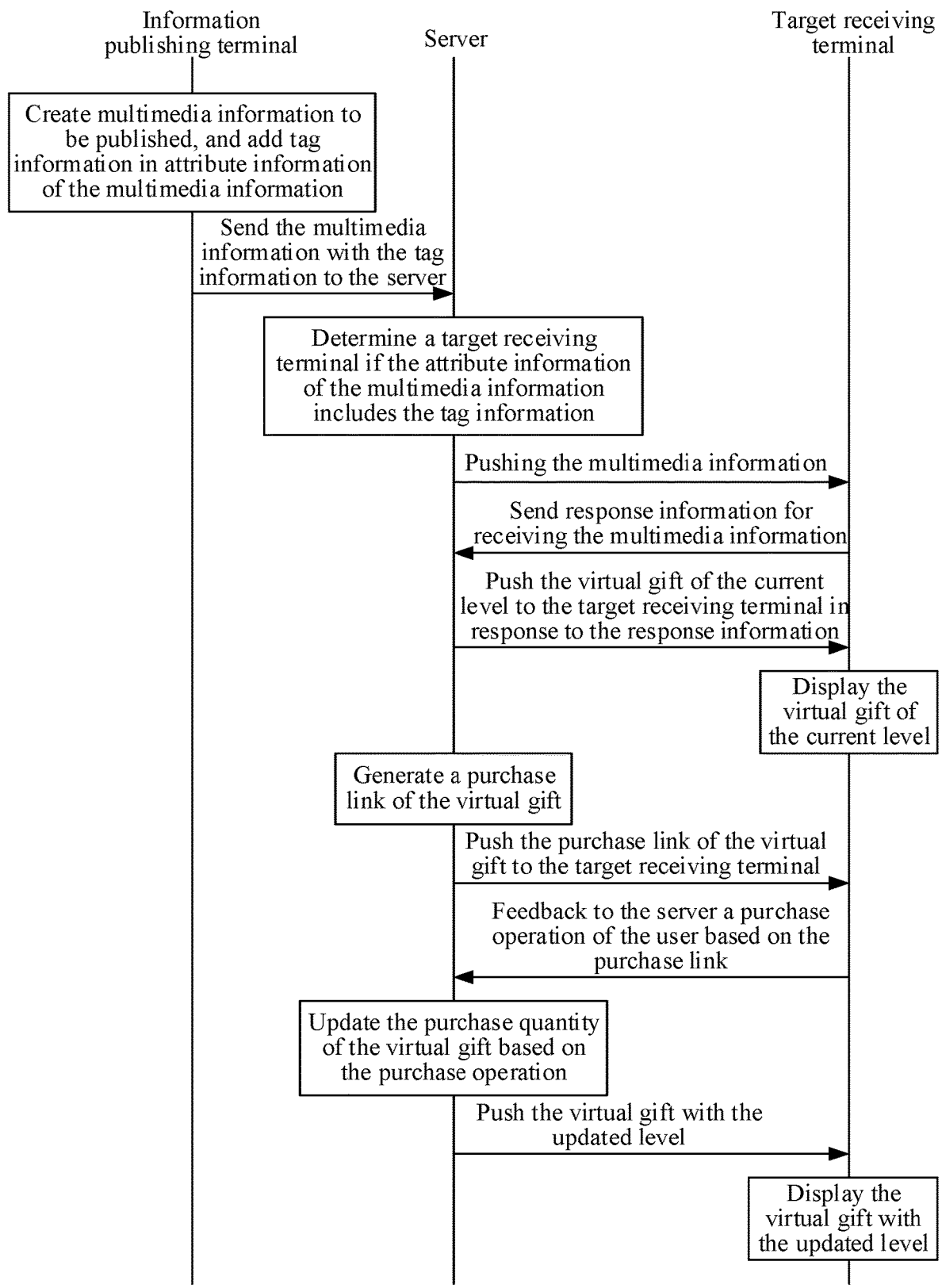
FIG. 8 is a schematic diagram of interaction of a system for displaying a virtual gift system according to the present disclosure.

FIG. 8 is a schematic diagram of an interaction of a virtual gift display system according to the present disclosure. The display system includes a server, an information publishing terminal and a target receiving terminal. As shown in FIG. 8, the interaction method includes:

creating, by an information publishing terminal, multimedia information to be published, and adding, by the information publishing terminal, tag information to attribute information of the multimedia information;

sending, by the information publishing terminal, the multimedia information to a server;

determining, by the server, a target receiving terminal if the attribute information of the multimedia information includes the tag information, and pushing the multimedia information to the target receiving terminal by the server;

receiving, by the target receiving terminal, the multimedia information, and sending response information for receiving the multimedia information to the server;

pushing, by the server, the virtual gift of a current level to the target receiving terminal based on the response information;

receiving and displaying the virtual gift of the current level by the target receiving terminal;

generating, by the server, a purchase link of the virtual gift, and pushing the purchase link of the virtual gift to the target receiving terminal;

feeding back, by the target receiving terminal to the server, a purchase operation performed by the user based on the purchase link; and updating, by the server, the level of the virtual gift based on the purchase operation, and pushing the virtual gift of an updated level to the target receiving terminal; and displaying, by the target receiving terminal, the virtual gift of the updated level.

Figure 9:
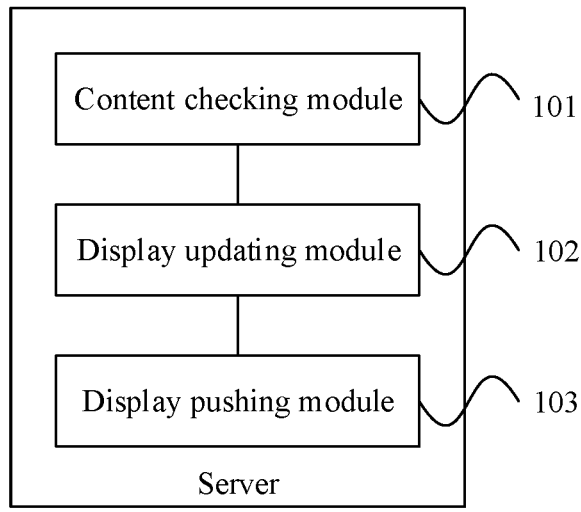
FIG. 9 is a schematic structural diagram of a server according to the present disclosure.

A server is provided according to an embodiment of the present disclosure, and FIG. 9 is a schematic structural diagram of a server according to the present disclosure. As shown in FIG. 9, the server may include: a content checking module 101, a display updating module 102, and a display pushing module 103. The content checking module 101 is configured to obtain multimedia information to be published, and determine a target receiving terminal if the attribute information of the multimedia information includes preset tag information, push the multimedia information to the target receiving terminal, and determine the validity period of the virtual gift corresponding to the multimedia information. The display updating module 102 is configured to obtain, if it is determined that the target receiving terminal has received the multimedia information within the validity period of the virtual gift, a current level of the virtual gift corresponding to the target receiving terminal based on a current purchase quantity of the virtual gift and a predetermined correspondence between a purchase quantity and a level of the virtual gift. The display pushing module 103 is configured to push the virtual gift of the current level to the target receiving terminal, for the target receiving terminal to display.

The server according to the present disclosure specifically implements the process on the server side of the above method embodiments. For details, reference may be made to the content of the embodiment of the method for displaying a virtual gift on the server side, which will not be repeated here. In the present disclosure, the server obtains the multimedia information to be published, and determines the target receiving terminal if the attribute information of the multimedia information includes the preset tag information, so that a specific user can view the virtual gift, increasing enthusiasm of the users for participation. In addition, a validity period is set for the virtual gift, so that the user who see the virtual gift is motivated to purchase the virtual gift. When sending the virtual gift to the target receiving terminal, the virtual gift of the current level can be obtained based on the current purchase quantity of the virtual gift and a predetermined correspondence between the purchase quantity and the level of the virtual gift, so that the shape of the virtual gift changes with the purchase quantity, diversifying the display of the gift, improving joy of interaction with a creator.

On the basis of the above embodiments, in an embodiment, the server further includes: a purchase link generating module, a feedback receiving module, and a display sending module. The purchase link generating module is configured to generate a purchase link of the virtual gift, and push the purchase link of the virtual gift to the target receiving terminal. The feedback receiving module is configured to receive a purchase operation performed by the user based on the purchase link and fed back from the target receiving terminal, and update the purchase quantity of the virtual gift based on the purchase operation. The display sending module is configured to determine whether to update the level of the virtual gift based on the updated purchase quantity and the correspondence, and push, if the level of the virtual gift is updated, the virtual gift of an updated level to the target receiving terminal.

On the basis of the above embodiments, in an embodiment, the server further includes: a new receiving terminal determining module. The new receiving terminal determining module is configured to determine a new target receiving terminal after receiving the purchase operation performed by the user based on the purchase link and fed back from the target receiving terminal, and push the multimedia information to the new target receiving terminal.

On the basis of the above embodiments, in an embodiment, the server further includes: a notification module and a reply module. The notification module is configured to update the purchase quantity of the virtual gift, and push, if the updated purchase quantity meets a preset condition, a gift collection notification to the information publishing terminal. The gift collection notification includes a unique identifier of a user who has completed the purchase operation, so that the information publishing terminal selects the user who has completed the purchase operation as a target user based on the gift collection notification, and sends the unique identifier of the target user to the server. The reply module is configured to receive the unique identifier of the target user, determine the target receiving terminal corresponding to the target user based on a predetermined correspondence between the unique identifier of the user and the target receiving terminal, and send a reply message to the target receiving terminal corresponding to the target user.

On the basis of the above embodiments, in an embodiment, the content checking module is further configured to determine a validity period of the virtual gift corresponding to the multimedia information. Specifically, the validity period of the virtual gift is set starting from a time when the multimedia information is pushed to the target receiving terminal.

The server further includes: an expiration determining module. The expiration determining module is configured to obtain response information sent by the target receiving terminal when receiving the multimedia information, and determine, based on the response information, a time duration from a time when the multimedia information is pushed to the target receiving terminal to a time when the target receiving terminal receives the multimedia information, and determine, based on the time duration, whether the validity period has expired when the target receiving terminal receives the multimedia information.

On the basis of the above embodiments, in an embodiment, the server further includes: an assistance information sending module. The assistance information sending module is configured to receive a purchase operation performed by the user based on the purchase link and fed back from the target receiving terminal, and push the assistance information to the information publishing terminal. The assistance information includes one or more of the following: a remaining duration of the validity period, the quantity of the virtual gift that has been obtained, the cumulated quantity of playbacks, the quantity of the virtual gift required for the next level, and a ranking of the information publishing terminal. The ranking of the information publishing terminal is obtained by sorting the quantity of the virtual gift received by each information publishing terminal in a descending order.

Figure 10:
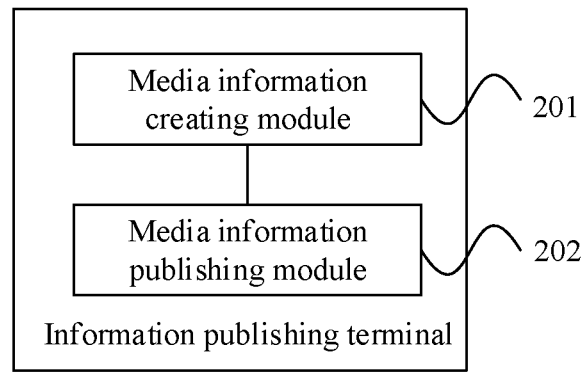
FIG. 10 is a schematic structural diagram of an information publishing terminal according to the present disclosure.

An information publishing terminal is provided according to an embodiment of the present disclosure. FIG. 10 is a schematic structural diagram of an information publishing terminal according to the present disclosure. As shown in FIG. 10, the information publishing terminal may include: a media information creating module 201 and a media information publishing module 202. The media information creating module 201 is configured to create multimedia information to be published, and add tag information to attribute information of the multimedia information. The media information publishing module 202 is configured to send the multimedia information with the tag information to the server, where the multimedia information with the tag information is used for the server to determine the target receiving terminal for receiving the multimedia information.

The information publishing terminal according to the present disclosure specifically implements the process on the information publishing terminal side of the above method embodiments. For details, reference may be made to the content of the embodiment of the method for displaying a virtual gift on the information publishing terminal side, which will not be repeated here. The information publishing terminal according to the present disclosure sets the tag information in the multimedia information to be published, and the server can determine the target receiving terminal by checking the multimedia information, so that the specific user can see the virtual gift, increasing enthusiasm of the users for participation.

On the basis of the above embodiments, in an embodiment, the information publishing terminal further includes: a user determining module. The user determining module is configured to receive a gift collection notification pushed by the server after the multimedia information is sent to the server, and select a target receiving terminal that has completed the purchase operation based on the gift collection notification, so that the server can send a reply message to the target receiving terminal that has completed the purchase operation.

Figure 11:
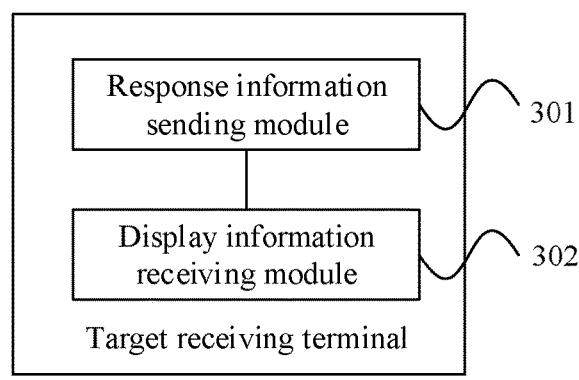
FIG. 11 is a schematic structural diagram of a target receiving terminal according to the present disclosure.

A target receiving terminal is provided according to an embodiment of the present disclosure. FIG. 11 is a schematic structural diagram of a target receiving terminal according to the present disclosure. As shown in FIG. 11, the target receiving terminal may include: a response information sending module 301 and a display information receiving module 302. The response information sending module 301 is configured to receive multimedia information, and send response information for receiving the multimedia information to the server, so that the server pushes the virtual gift of the current level based on the response information. The display information receiving module 302 is configured to receive and display the virtual gift of the current level.

The target receiving terminal according to the present disclosure specifically executes the process on the target receiving terminal side of the above method embodiments. For details, reference may be made to the content of the embodiments of the above method for displaying a virtual gift on the target receiving terminal side, which will not be repeated here. The target receiving terminal according to the present disclosure sends the response information for receiving the multimedia information after receiving the multimedia information, the server pushes the virtual gift of the current level to the target receiving terminal based on the response information, and the target receiving terminal receives and displays the virtual gift of the current level, which increases the enthusiasm of the user to purchase the virtual gift.

An electronic device is provided according to the present disclosure, the electronic device includes: a memory, a processor, and at least one program stored in the memory and executed by the processor. Compared with the conventional art, multimedia information to be published is obtained, if the attribute information of the multimedia information includes preset tag information, the target receiving terminal is determined, so that a specific user can view the virtual gift, increasing enthusiasm of the users for participation. In addition, a validity period is set for the virtual gift, so that the user who see the virtual gift is motivated to purchase the virtual gift. When sending the virtual gift to the target receiving terminal, the virtual gift of the current level can be obtained based on the purchase quantity and a predetermined correspondence between the purchase quantity and the level of the virtual gift, so that the shape of the virtual gift changes with the purchase quantity, diversifying the display of the gift, improving joy of interaction with a creator.

Figure 12:
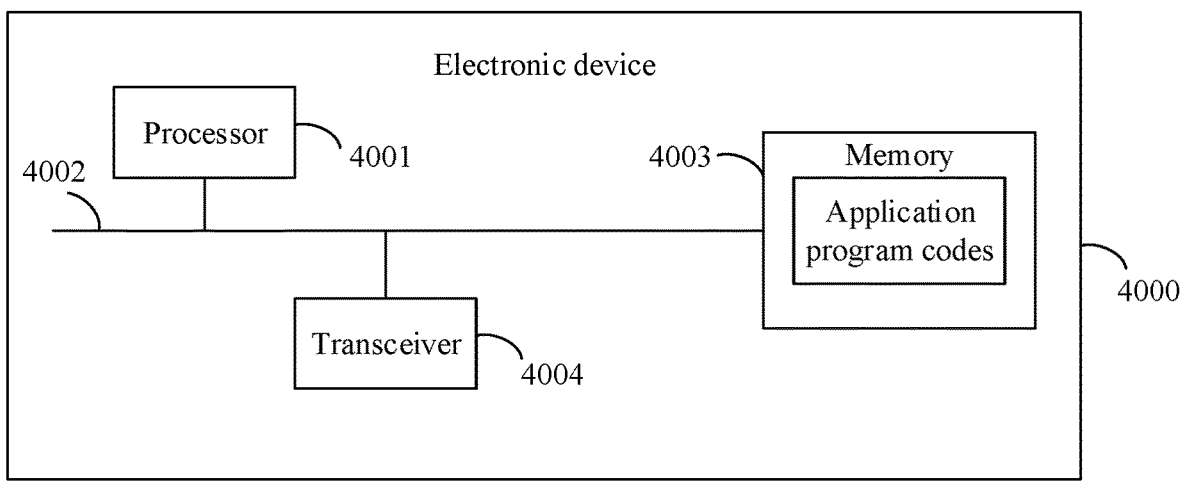
FIG. 12 is a schematic structural diagram of an electronic device according to the present disclosure.

In an embodiment, an electronic device is provided, as shown in FIG. 12, which is a schematic structural diagram of an electronic device according to the present disclosure. The electronic device 4000 shown in FIG. 12 includes a processor 4001 and a memory 4003. The processor 4001 is connected to the memory 4003, for example, through a bus 4002. In an embodiment, the electronic device 4000 may further include a transceiver 4004. It is to be noted that, in practice, the transceiver 4004 is not limited to one, and the structure of the electronic device 4000 does not constitute a limitation of the present disclosure.

The processor 4001 may be a central processing unit (CPU), a general-purpose processor, a data signal processor (DSP), an application specific integrated circuit (ASIC), a field programmable gate array (FPGA) or another programmable logic device, a transistor logic device, a hardware component, or any combination thereof. The processor 4001 may implement or execute the various exemplary logical blocks, modules and circuits described in combination with this disclosure. The processor 4001 may also be a combination for realizing computing functions, such as a combination of one or more microprocessors, a combination of a DSP and a microprocessor.

The bus 4002 may include a path to transfer information between the components described above. The bus 4002 may be a Peripheral Component Interconnect (PCI) bus or an Extended Industry Standard Architecture (EISA) bus or the like. The bus 4002 may be an address bus, a data bus, a control bus, and the like. For ease of presentation, the bus is represented by only one thick line in FIG. 12, which does not mean that there is only one bus or one type of bus.

The memory 4003 may be a Read Only Memory (ROM) or other types of static storage devices that may store static information and instructions, a Random Access Memory (RAM) or other types of dynamic storage devices that may store information and instructions, an Electrically Erasable Programmable Read Only Memory (EEPROM), Compact Disc Read Only Memory (CD-ROM) or other optical disk storage, optical disk storage (including compressed compact disc, laser disc, compact disc, digital versatile disc, Blu-ray disc, and the like), magnetic disk storage medium or other magnetic storage devices, or any other medium capable of carrying or storing desired program code in the form of instructions or data structures and capable of being accessed by a computer, but the present disclosure is not limited thereto.

The memory 4003 is used for storing the application program code for implementing the solutions of the present disclosure, which is executed by the processor 4001. The processor 4001 is configured to execute the application program code stored in the memory 4003 to implement the content shown in the above method embodiments.

A computer-readable storage medium is provided according to the present disclosure, where a computer program is stored on the computer-readable storage medium. The computer program, when ran on a computer, cause the computer to perform the content in the above method embodiments. Compared with the conventional art, multimedia information to be published is obtained, if the attribute information of the multimedia information includes preset tag information, the target receiving terminal is determined, so that a specific user can view the virtual gift, increasing enthusiasm of the users for participation. In addition, a validity period is set for the virtual gift, so that the user who see the virtual gift is motivated to purchase the virtual gift. When sending the virtual gift to the target receiving terminal, the virtual gift of the current level can be obtained based on the purchase quantity and a predetermined correspondence between the purchase quantity and the level of the virtual gift, so that the shape of the virtual gift changes with the purchase quantity, diversifying the display of the gift, improving joy of interaction with a creator.

It is to be understood that although the various steps in the flowchart of the drawings are sequentially shown in the order indicated by the arrows, these steps are not necessarily executed in sequence in the order indicated by the arrows. Unless explicitly stated herein, the execution of these steps is not strictly limited to the order and may be performed in other orders. Moreover, at least a part of the steps in the flowchart of the drawings may include multiple sub-steps or multiple stages, and these sub-steps or stages are not necessarily executed at the same time, but may be executed at different times, and are not necessarily have to be performed sequentially, but may be performed alternately or alternately with other steps or at least a part of sub-steps or stages of other steps.

The above are only some embodiments of the present disclosure. It should be pointed out that for those skilled in the art, some improvements and modifications may be made without departing from the principles of the present disclosure. These improvements and modifications should also be regarded as within the protection scope of the present disclosure.

A method for displaying a virtual gift is provided according to the present disclosure, which is applied to a server. The method includes:

obtaining multimedia information to be published, determining a target receiving terminal if attribute information of the multimedia information includes preset tag information, pushing the multimedia information to the target receiving terminal, and determining a validity period of a virtual gift corresponding to the multimedia information;

obtaining, if it is determined that the target receiving terminal has received the multimedia information within the validity period of the virtual gift, a current level of the virtual gift corresponding to the target receiving terminal based on a current purchase quantity of the virtual gift and a predetermined correspondence between a purchase quantity and a level of the virtual gift and pushing the virtual gift of the current level to the target receiving terminal, for the target receiving terminal to display.

On the basis of the above embodiments, in an embodiment, before pushing the virtual gift of the current level to the target receiving terminal, the method further includes:

generating a purchase link of the virtual gift, and pushing the purchase link of the virtual gift to the target receiving terminal;

receiving a purchase operation performed by a user based on the purchase link and fed back from the target receiving terminal, and updating the purchase quantity of the virtual gift based on the purchase operation; and determining whether to update the level of the virtual gift based on an updated purchase quantity and the correspondence, and pushing, if the level of the virtual gift is updated, the virtual gift of the updated level to the target receiving terminal.

On the basis of the above embodiments, in an embodiment, after receiving a purchase operation performed by a user based on the purchase link and fed back from the target receiving terminal, the method further includes:

determining a new target receiving terminal, and pushing the multimedia information to the new target receiving terminal.

On the basis of the above embodiments, in an embodiment, after receiving a purchase operation performed by a user based on the purchase link and fed back from the target receiving terminal, the method further includes:

updating the purchase quantity of the virtual gift, pushing, if the updated purchase quantity meets a preset condition, a gift collection notification to the information publishing terminal, where the gift collection notification includes a unique identifier of a user who has completed the purchase operation, and the information publishing terminal selects the user who has completed the purchase operation as a target user based on the gift collection notification, and sends the unique identifier of the target user to the server; and receiving the unique identifier of the target user, determining a target receiving terminal corresponding to the target user based on a predetermined correspondence between a unique identifier of a user and a target receiving terminal, and sending a reply message to the target receiving terminal corresponding to the target user.

On the basis of the above embodiments, in an embodiment, the determining a validity period of a virtual gift corresponding to the multimedia information includes: setting the validity period of the virtual gift starting from a time when the multimedia information is pushed to the target receiving terminal; and before it is determined that the target receiving terminal has received the multimedia information within the validity period of the virtual gift, the method further includes:

obtaining response information sent by the target receiving terminal when receiving the multimedia information, and determining, based on the response information, a time duration from a time when the multimedia information is pushed to the target receiving terminal to a time when the target receiving terminal receives the multimedia information, and determining, based on the time duration, whether the validity period is expired when the target receiving terminal receives the multimedia information.

On the basis of the above embodiments, in an embodiment, after the receiving a purchase operation performed a user based on the purchase link and fed back from the target receiving terminal, the method further includes:

pushing assistance information to the information publishing terminal, where the assistance information includes one or more of the following: a remaining duration of the validity period, the quantity of the virtual gift that has been obtained, the cumulated quantity of playbacks, the quantity of the virtual gift required for a next level, and a ranking of the information publishing terminal, where the ranking of the information publishing terminal is obtained by sorting the quantity of the virtual gift received by each information publishing terminal in a descending order.

A method for displaying a virtual gift is provided according to the present disclosure, which is applied to an information publishing terminal. The method includes:

creating multimedia information to be published, and adding tag information in attribute information of the multimedia information; and sending the multimedia information with the tag information to a server, where the multimedia information with the tag information is used for the server to determine a target receiving terminal for receiving the multimedia information.

On the basis of the above embodiments, in an embodiment, after the sending the multimedia information to the server, the method further includes:

receiving a gift collection notification pushed by the server, and selecting a target receiving terminal that has completed the purchase operation based on the gift collection notification, so that the server sends a reply message to the target receiving terminal that has completed the purchase operation.

A method for displaying a virtual gift is provided according to the present disclosure, which is applied to a target receiving terminal. The method includes:

receiving multimedia information, and sending, to a server, response information for receiving the multimedia information, where the response information is used for the server to push a virtual gift of a current level; and receiving and displaying the virtual gift of the current level.

On the basis of the above embodiments, in an embodiment, after the sending, to a server, response information for receiving the multimedia information, the method further includes:

receiving a purchase link of the virtual gift;

feeding back, to the server, a purchase operation of a user performed based on the purchase link, where the server pushes the virtual gift of an updated level to the target receiving terminal based on the purchase operation; and receiving and displaying the virtual gift of the updated level.

A server is provided according to the present disclosure, which includes which includes: a content checking module, a display updating module, and a display pushing module. The content checking module is configured to obtain the multimedia information to be published, and if the attribute information of the multimedia information includes preset tag information, determine a target receiving terminal, push the multimedia information to the target receiving terminal, and determine the validity period of the virtual gift corresponding to the multimedia information. The display updating module is configured to obtain, if it is determined that the target receiving terminal has received the multimedia information within the validity period of the virtual gift, a current level of the virtual gift based on a current purchase quantity of the virtual gift and a predetermined correspondence between a purchase quantity and a level of the virtual gift. The display pushing module is configured to push the virtual gift of the current level to the target receiving terminal, for the target receiving terminal to display.

On the basis of the above embodiments, in an embodiment, the server further includes: a purchase link generating module, a feedback receiving module, and a display sending module. The purchase link generating module is configured to generate a purchase link of the virtual gift, and push the purchase link of the virtual gift to the target receiving terminal. The feedback receiving module is configured to receive a purchase operation performed by the user based on the purchase link and fed back from the target receiving terminal, and update the purchase quantity of the virtual gift based on the purchase operation. The display sending module is configured to determine whether to update the level of the virtual gift based on the updated purchase quantity and the correspondence, and push, if the level of the virtual gift is updated, the virtual gift of an updated level to the target receiving terminal.

On the basis of the above embodiments, in an embodiment, the server further includes: a new receiving terminal determining module. The new receiving terminal determining module is configured to determine a new target receiving terminal after receiving the purchase operation performed by the user based on the purchase link and fed back by the target receiving terminal, and push the multimedia information to the new target receiving terminal.

On the basis of the above embodiments, in an embodiment, the server further includes: a notification module and a reply module. The notification module is configured to update the purchase quantity of the virtual gift, and push, if the updated purchase quantity meets a preset condition, a gift collection notification to the information publishing terminal. The gift collection notification includes a unique identifier of a user who has completed the purchase operation, so that the information publishing terminal selects the user who has completed the purchase operation as a target user based on the gift collection notification, and sends the unique identifier of the target user to the server. The reply module is configured to receive the unique identifier of the target user, determine the target receiving terminal corresponding to the target user based on a predetermined correspondence between the unique identifier of the user and the target receiving terminal, and send a reply message to the target receiving terminal corresponding to the target user.

On the basis of the above embodiments, in an embodiment, the content checking module is further configured to determine a validity period of the virtual gift corresponding to the multimedia information. Specifically, the validity period of the virtual gift is set starting from a time when the multimedia information is pushed to the target receiving terminal.

The server further includes: an expiration determining module. The expiration determining module is configured to obtain response information sent by the target receiving terminal when receiving the multimedia information, and determine, based on the response information, a time duration from a time when the multimedia information is pushed to the target receiving terminal to a time when the target receiving terminal receives the multimedia information, and determine, based on the time duration, whether the validity period has expired when the target receiving terminal receives the multimedia information.

On the basis of the above embodiments, in an embodiment, the server further includes: an assistance information sending module. The assistance information sending module is configured to receive a purchase operation performed by the user based on the purchase link and fed back by the target receiving terminal, and push the assistance information to the information publishing terminal. The assistance information includes one or more of the following: a remaining duration of the validity period, the quantity of the virtual gift that has been obtained, the cumulated quantity of playbacks, the quantity of the virtual gift required for the next level, and a ranking of the information publishing terminal. The ranking of the information publishing terminal is obtained by sorting the quantity of the virtual gift received by each information publishing terminal in a descending order.

An information publishing terminal is provided according to the present disclosure, which includes: a media information creating module, and a media information publishing module. The media information creation module is configured to create multimedia information to be published, and add tag information to attribute information of the multimedia information. The media information publishing module is configured to send the multimedia information with the tag information to a server, where the multimedia information with the tag information is used for the server to determine a target receiving terminal for receiving the multimedia information.

On the basis of the above embodiments, in an embodiment, the information publishing terminal further includes: a user determining module. The user determining module is configured to receive a gift collection notification pushed by the server after sending the multimedia information to the server, and select a target receiving terminal that has completed the purchase operation based on the gift collection notification, so that the server can send a reply message to the target receiving terminal that has completed the purchase operation.

A target receiving terminal is provided according to the present disclosure, which includes: a response information sending module and a display information receiving module. The response information sending module is configured to receive multimedia information, and send response information of receiving the multimedia information to a server, where the response information is used for the server to push the virtual gift of a current level. The display information receiving module is configured to receive and display the virtual gift of the current level.

The invention claimed is:

1. A method for displaying a virtual gift, applied to a server, the method comprising:
    obtaining multimedia information to be published, determining a target receiving terminal in response to determining that an attribute information of the multimedia information comprises preset tag information, the tag information instructing the server to configure a virtual gift that can be purchased and displayed for the multimedia information, pushing the multimedia information to the target receiving terminal, and determining a validity period of the virtual gift corresponding to the multimedia information;
    obtaining, in response to determining that the target receiving terminal has received the multimedia information within the validity period of the virtual gift, a current level of the virtual gift based on a current purchase quantity of the virtual gift and a predetermined correspondence between a purchase quantity and a level of the virtual gift, the virtual gift being a dynamic icon that changes display effect, different levels of virtual gifts being displayed with different effects;
    pushing the virtual gift of the current level to the target receiving terminal, for the target receiving terminal to display;
    generating a purchase link of the virtual gift, and pushing the purchase link of the virtual gift to the target receiving terminal;
    receiving a purchase operation performed by a user based on the purchase link and fed back from the target receiving terminal, and updating the current purchase quantity of the virtual gift based on the purchase operation; and
    determining whether to update the current level of the virtual gift based on an updated purchase quantity and the correspondence, and pushing, in response to determining that the current level of the virtual gift is updated, the virtual gift of an updated level to the target receiving terminal.

2. The method for displaying a virtual gift according to claim 1, wherein after the receiving a purchase operation performed by a user based on the purchase link and fed back from the target receiving terminal, the method further comprises:
    determining a new target receiving terminal, and pushing the multimedia information to the new target receiving terminal.

3. The method for displaying a virtual gift according to claim 1, wherein after the receiving a purchase operation performed by a user based on the purchase link and fed back from the target receiving terminal, the method further comprises:

updating the current purchase quantity of the virtual gift, and pushing, in response to determining that the updated purchase quantity meets a preset condition, a gift collection notification to an information publishing terminal, wherein the gift collection notification comprises a unique identifier of a user who has completed the purchase operation, and the information publishing terminal selects, based on the gift collection notification, the user who has completed the purchase operation as a target user, and sends the unique identifier of the target user to the server; and receiving the unique identifier of the target user, determining a target receiving terminal corresponding to the target user based on a predetermined correspondence between the unique identifier of the user and the target receiving terminal, and sending a reply message to the target receiving terminal corresponding to the target user.

4. The method for displaying a virtual gift according to claim 1, wherein the determining a validity period of a virtual gift corresponding to the multimedia information comprises: setting the validity period of the virtual gift starting from a time when the multimedia information is pushed to the target receiving terminal;

before determining that the target receiving terminal has received the multimedia information within the validity period of the virtual gift, the method further comprises:

obtaining response information sent by the target receiving terminal when receiving the multimedia information, and determining, based on the response information, a time duration from a time when the multimedia information is pushed to the target receiving terminal to a time when the target receiving terminal receives the multimedia information, and determining, based on the time duration, whether the validity period is expired when the target receiving terminal receives the multimedia information.

5. The method for displaying a virtual gift according to claim 3, wherein after the receiving a purchase operation performed by a user based on the purchase link and fed back from the target receiving terminal, the method further comprises:

pushing assistance information to an information publishing terminal, wherein the assistance information comprises one or more of the following: a remaining duration of the validity period, the quantity of the virtual gift that has been obtained, the cumulated quantity of playbacks, the quantity of the virtual gift required for a next level, and a ranking of the information publishing terminal, wherein the ranking of the information publishing terminal is obtained by sorting the quantity of the virtual gift received by each information publishing terminal in a descending order.

6. A server, comprising:
at least one processor; and
at least one memory communicatively coupled to the at least one processor and storing instructions that upon execution by the at least one processor cause the server to:
obtain multimedia information to be published, determine a target receiving terminal if attribute information of the multimedia information comprises preset tag information, the tag information instructing the server to configure a virtual gift that can be purchased and displayed for the multimedia information, push the multimedia information to the target receiving terminal, and determine a validity period of the virtual gift corresponding to the multimedia information;

obtain, if it is determined that the target receiving terminal has received the multimedia information within the validity period of the virtual gift, a current level of the virtual gift based on a current purchase quantity of the virtual gift and a predetermined correspondence between a purchase quantity and a level of the virtual gift, the virtual gift being a dynamic icon that changes display effect, different levels of virtual gifts being displayed with different effects;

push the virtual gift of the current level to the target receiving terminal, for the target receiving terminal to display;

generate a purchase link of the virtual gift, and push the purchase link of the virtual gift to the target receiving terminal;

receive a purchase operation performed by a user based on the purchase link and fed back from the target receiving terminal, and update the current purchase quantity of the virtual gift based on the purchase operation; and determine whether to update the current level of the virtual gift based on an updated purchase quantity and the correspondence, and push, in response to determining that the current level of the virtual gift is updated, the virtual gift of an updated level to the target receiving terminal.

7. The server of claim 6, the at least one memory further storing instructions that upon execution by the at least one processor cause the apparatus to:
determine a new target receiving terminal, and pushing the multimedia information to the new target receiving terminal.

8. The server of claim 6, the at least one memory further storing instructions that upon execution by the at least one processor cause the apparatus to:
update the current purchase quantity of the virtual gift, and pushing, if the updated purchase quantity meets a preset condition, a gift collection notification to an information publishing terminal, wherein the gift collection notification comprises a unique identifier of the user who has completed the purchase operation, and the information publishing terminal selects, based on the gift collection notification, the user who has completed the purchase operation as a target user, and sends the unique identifier of the target user to the server; and receive the unique identifier of the target user, determining a target receiving terminal corresponding to the target user based on a predetermined correspondence between the unique identifier of the user and the target receiving terminal, and sending a reply message to the target receiving terminal corresponding to the target user.

9. The server of claim 6, the at least one memory further storing instructions that upon execution by the at least one processor cause the apparatus to:
set the validity period of the virtual gift starting from a time when the multimedia information is pushed to the target receiving terminal;

obtain response information sent by the target receiving terminal when receiving the multimedia information, and determining, based on the response information, a time duration from a time when the multimedia information is pushed to the target receiving terminal to a time when the target receiving terminal receives the multimedia information, and determining, based on the time duration, whether the validity period is expired when the target receiving terminal receives the multimedia information.

10. The server of claim 7, the at least one memory further storing instructions that upon execution by the at least one processor cause the apparatus to:

push assistance information to an information publishing terminal, wherein the assistance information comprises one or more of the following: a remaining duration of the validity period, the quantity of the virtual gift that has been obtained, the cumulated quantity of playbacks, the quantity of the virtual gift required for a next level, and a ranking of the information publishing terminal, wherein the ranking of the information publishing terminal is obtained by sorting the quantity of the virtual gift received by each information publishing terminal in a descending order.

11. A computer-readable non-transitory storage medium storing a computer program, wherein the computer program, when executed by a processor, implements the method according to claim 1.

\* \* \* \* \*